United States Patent [19]
Williams

[11] Patent Number: 5,543,671
[45] Date of Patent: Aug. 6, 1996

[54] ELECTRIC MOTOR TERMINAL BOARD WITH INTEGRAL SWITCH LOCKING MEANS

[75] Inventor: Ronald D. Williams, St. Charles, Mo.

[73] Assignee: Emerson Electric Co., St. Louis, Mo.

[21] Appl. No.: 181,618

[22] Filed: Jan. 13, 1994

[51] Int. Cl.$^6$ ..................................... H02K 11/00
[52] U.S. Cl. .............. 310/71; 310/42; 310/684; 310/89; 310/91; 200/80 R
[58] Field of Search ............... 310/71, 91, 68 R, 310/68 A, 68 E, 89, 42; 200/80 R, 80 A, 80 B

[56] References Cited

U.S. PATENT DOCUMENTS

| | | | |
|---|---|---|---|
| 4,034,173 | 7/1977 | Crow | 200/80 R |
| 4,038,574 | 7/1977 | Crow | 310/71 |
| 4,307,508 | 12/1981 | Anderson | 310/71 |
| 5,070,265 | 12/1991 | Williams | 310/71 |

*Primary Examiner*—R. Skudy
*Attorney, Agent, or Firm*—Polster, Lieder, Woodruff & Lucchesi

[57] ABSTRACT

A terminal board for a dynamoelectric machine is mounted to an end-shield of the machine. The terminal board has securing means for fixing an electrical switch to the terminal board using a single conventional fastener. A second snap-in arrangement is provided in place of additional fastener. The terminal board includes an arm spaced from the fastener hole. The arm is spaced above a surface of the terminal board and defines a slit with the terminal board through which an ear of the switch extends. A finger extends down from a free end of the arm to define a stop which maintains the switch ear in the slot. The finger and the single fastener together fix the switch to the terminal board.

21 Claims, 3 Drawing Sheets

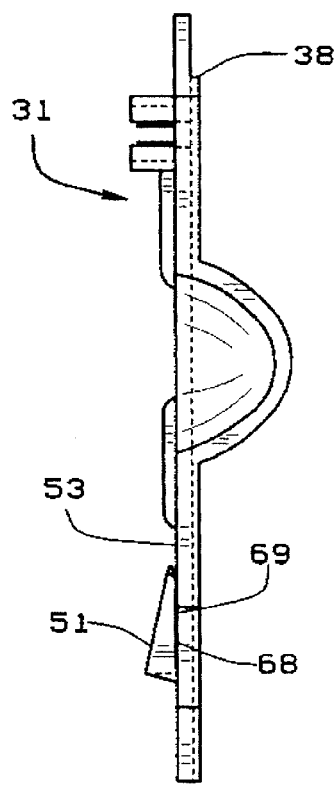
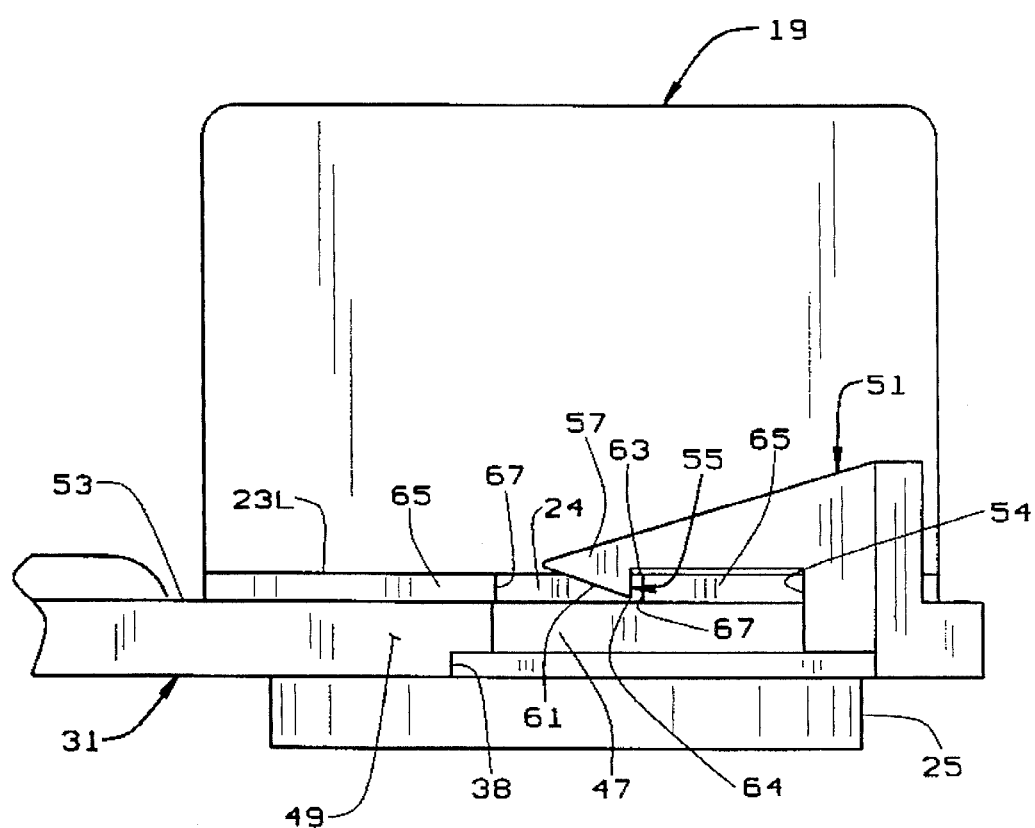
FIG. 5
FIG. 6

ELECTRIC MOTOR TERMINAL BOARD WITH INTEGRAL SWITCH LOCKING MEANS

BACKGROUND OF THE INVENTION

This invention relates to terminal boards for dynamoelectric machines in the form of electric motors and the like, and in particular, to a terminal board which includes an integral lock for securing an electrical switch to the terminal board using only a single fastener. While the invention is described in particular with respect to pump motors, those skilled in the art will recognize the wider applicability of the invention.

Electric motors and generators (broadly referred to as dynamoelectric machines) conventionally include a casing or shell which houses a rotor and a stator. The casing is closed by end-shields. A rotor shaft, extending axially from the rotor, is journaled in the end-shields for rotation. In certain applications employing A. C. induction motors, for example, in the form of split phase or capacitor start motors, a starting switch is associated with the terminal board. The board may have other control circuits or devices associated with it. When these motors are employed a fluid pump, the board and any associated control circuit elements often are mounted outboardly of one of the end-shields, and the terminal board area is enclosed by an end-shield cover. Preferably, the terminal board is mounted to an outboard surface of the end-shield. The switch is generally secured to the terminal board with two screws or other type of fastener. In the pump motor just described, assembly of the components is simplified if the number of fasteners are reduced to one. In particular, assembly of the motor itself and attachment of the switch to the board is made more easily and more quickly.

SUMMARY OF THE INVENTION

One object of the present invention is to provide a terminal board for a dynamoelectric machine on which an electrical switch can be mounted.

Another object is to provide such a terminal board to which the switch can be easily and quickly mounted.

Another object is to provide such a terminal board to which the switch can be mounted with only a single fastener.

These and other objects will become apparent to those skilled in the art in light of the following disclosure and accompanying drawings.

In accordance with the invention, generally stated, a terminal board for a dynamoelectric machine is provided and constructed so that a switch is attachable to the board using a single fastener. The terminal board has an opening formed in it sized to receive the single fastener. The switch is housed in a switch body which includes a first ear and a second ear. The ears are generally symmetrical. Each ear defines a closed bottom channel or slot sized to receive the fastener along respective edges of the slot. One switch body channel is aligned with the terminal board opening and receives the fastener to secure the switch to the board.

The slot in the second ear, also defines an edge. The terminal board includes an arm spaced from a surface of the board. The arm has a free end having a finger which extends towards the board. The finger, with the rest of the arm, forms a receptacle which receives the second ear of the switch body. The finger interacts with the inner edge of the second ear to mount the switch positionally onto the terminal board. The arm is preferably positioned at an edge of the terminal board and spaced from the fastener opening so as to engage the second ear. The leading edge of the finger can be beveled so that the switch ear can be slid into the receptacle. The arm is preferably slightly springy and holds the switch ear in the receptacle in a snap fit.

BRIEF DESCRIPTION OF THE DRAWINGS

FIG. 5 is a side elevational view of the terminal board; and

FIG. 6 is an enlarged end elevational view of the terminal board.

DESCRIPTION OF THE PREFERRED EMBODIMENT

Figure 1:
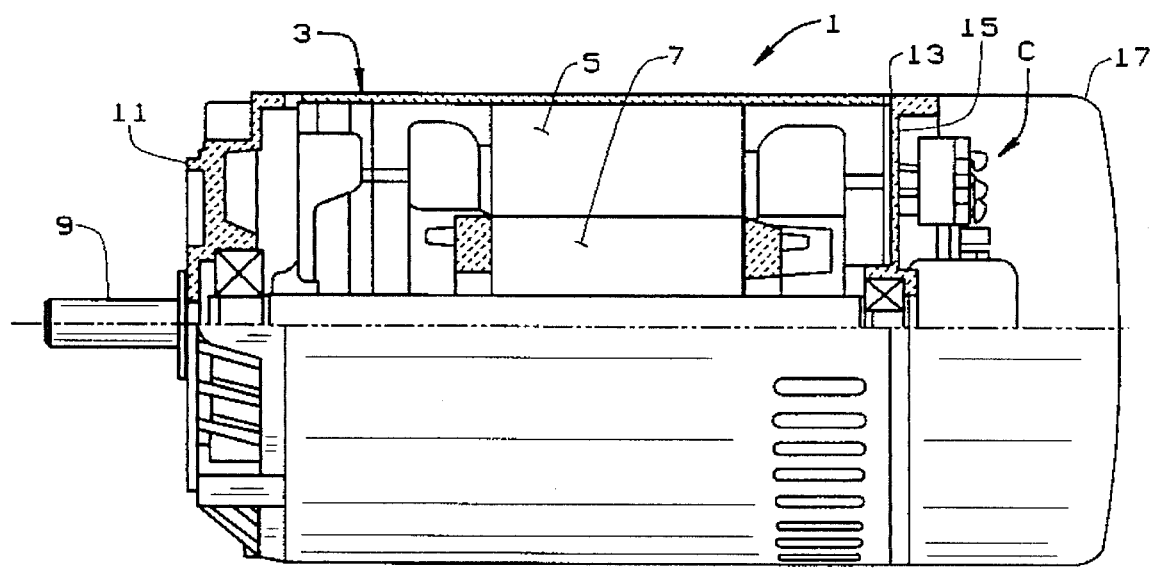
FIG. 1 is a side elevational view of a motor assembly, partly cut away employing one illustrative embodiment of the present invention.

Referring now to FIG. 1, reference numeral 1 indicates a motor assembly employing the present invention. Motor assembly 1 includes a casing or shell 3 housing a stator 5 and a rotor 7. A rotor shaft 9 extends axially from rotor 7. A first or bottom end-shield 11 closes a first or bottom end of casing 3. A second or top end-shield 13 closes a second or top of casing 3. Rotor shaft 9 is rotationally journaled in end-shields 11 and 13 and extends through bottom end-shield 11. A motor control circuitry C is mounted on an outboard surface 15 of top end-shield 13 and is enclosed by a conventional cover 17 which is not described in detail.

Figure 2:
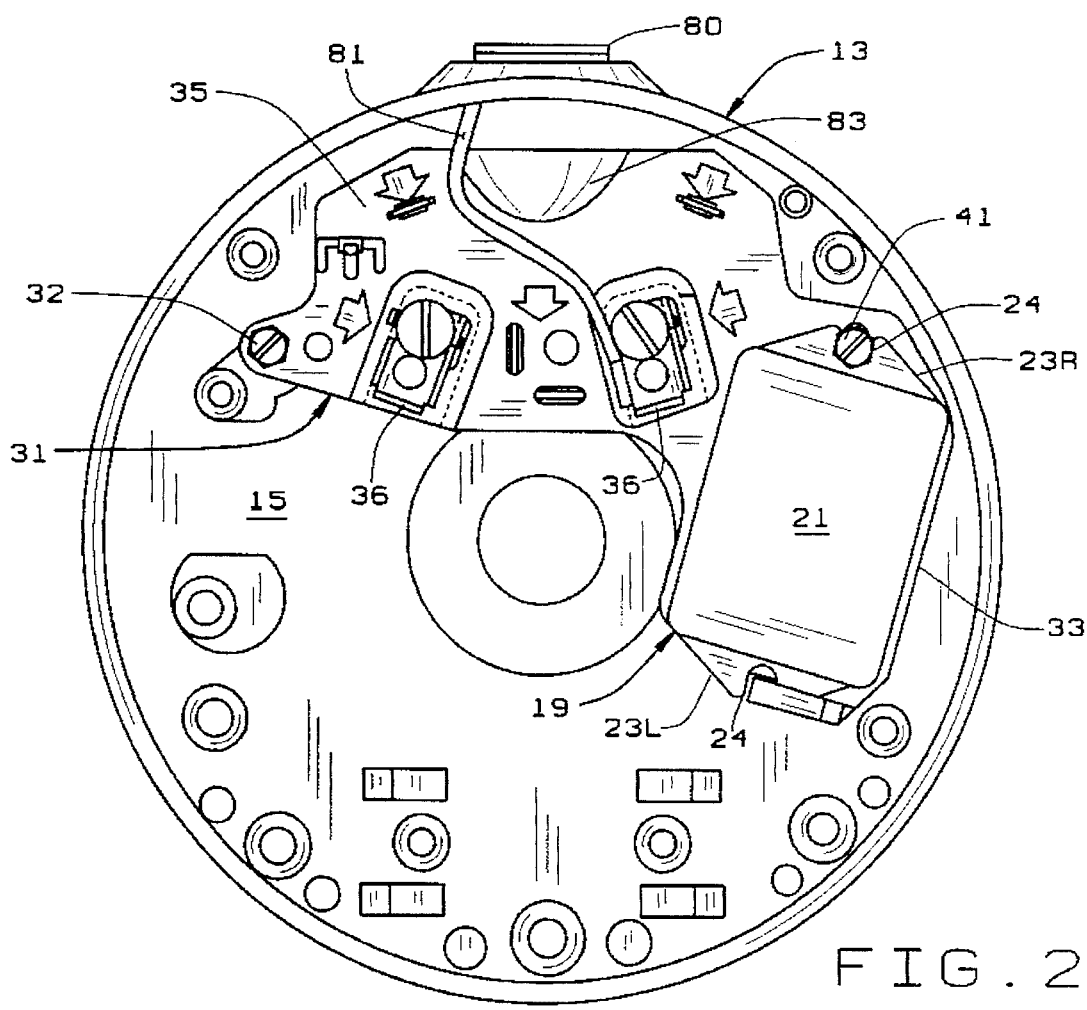
FIG. 2 is an end view of the motor shown in FIG. 1.

Circuit C includes, among other items, an electrical switch 19 (FIG. 2). Switch 19 is housed in a switch body 21 which has right and left ears 23R and 23L used to mount the switch in motor assembly 1. The ears are generally symmetrical. Each ear has an inwardly extending slot 24 formed therein. A plug connection 25 (FIG. 4) extends downwardly from body 21 to proved electrical connection of the switch to the motor 1 and to other elements in circuit C.

The shell 3 has a lead connection opening 80 formed in it. The opening 80 receives power leads, an example of which is shown at 81, which provides electrical power to the motor 1 at a terminal board 31.

Terminal boards, like board 31, are known in the art. For example, examples of prior art terminal boards are shown in U.S. Pat. Nos. 4,034,173, and 4,038,574, assigned to the assignee of the present invention. Certain constructional aspects of the terminal board 31, not a part of this invention, and the variety of mounting positions for such boards are disclosed in those patents, the specifications of which are intended to be incorporated herein by reference. It is sufficient here to note that a lead scoop 83 may be provided to direct the leads 81 to the connection side of terminal board 31.

Terminal board structures of the prior art also utilized other forms of switch structures. In other applications, however, switch structures like switch 19 are employed. As those skilled in the art recognize, it is desirable, from a manufacturing standpoint, to attach the switch 19 to terminal board 31 as quickly and easily as possible.

Figure 4:
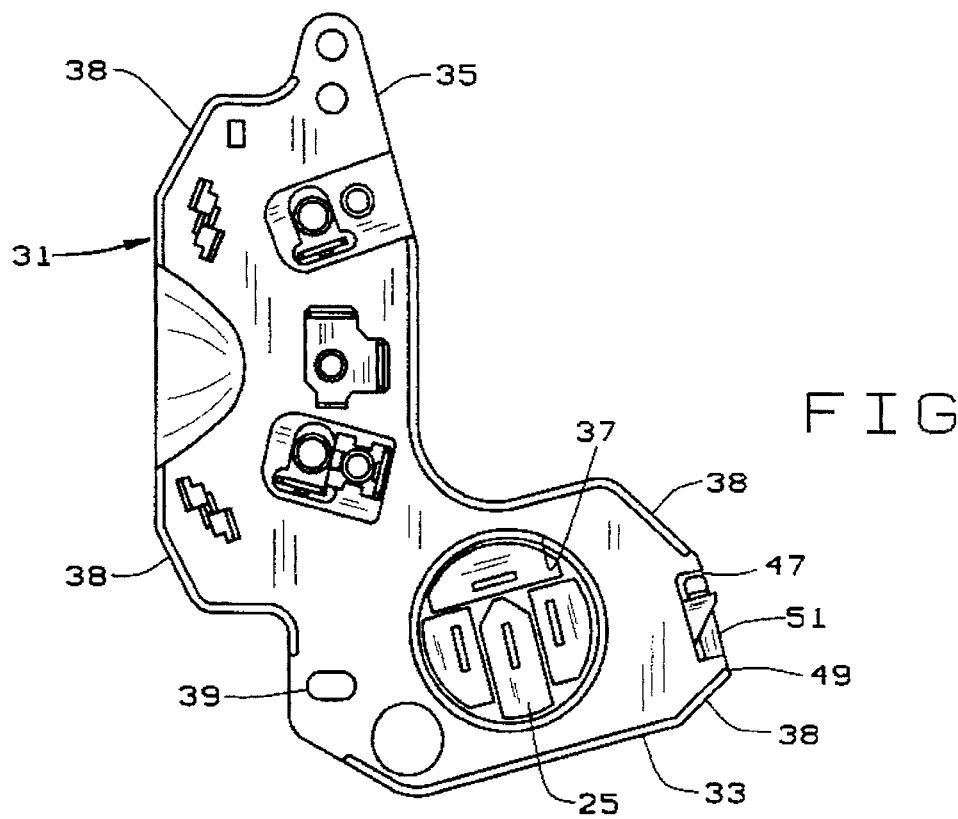
FIG. 4 is a bottom plan view of the terminal board.

As indicated, switch 19 is mounted on terminal board 31. Terminal board 31, in turn, is mounted to the outboard surface 15 of end-shield 13 by a screw 32, or other fastener known in the art. Board 31 is generally L-shaped and includes a foot 33 and a leg 35. An edge 38 depends from the periphery of terminal board 31. Edge 38 is preferably not continuous, but formed in sections, as is best seen in FIG. 4. Switch 19 is mounted to foot 33 and other elements of circuit C are connected to terminals 36 on leg 35. Board 31 is formed so that switch 19 may be mounted thereto using a single fastener. As will become apparent, the ability to secure the switch with a single fastener simplifies and speeds-up attachment of the switch to the board 31.

Figure 3:
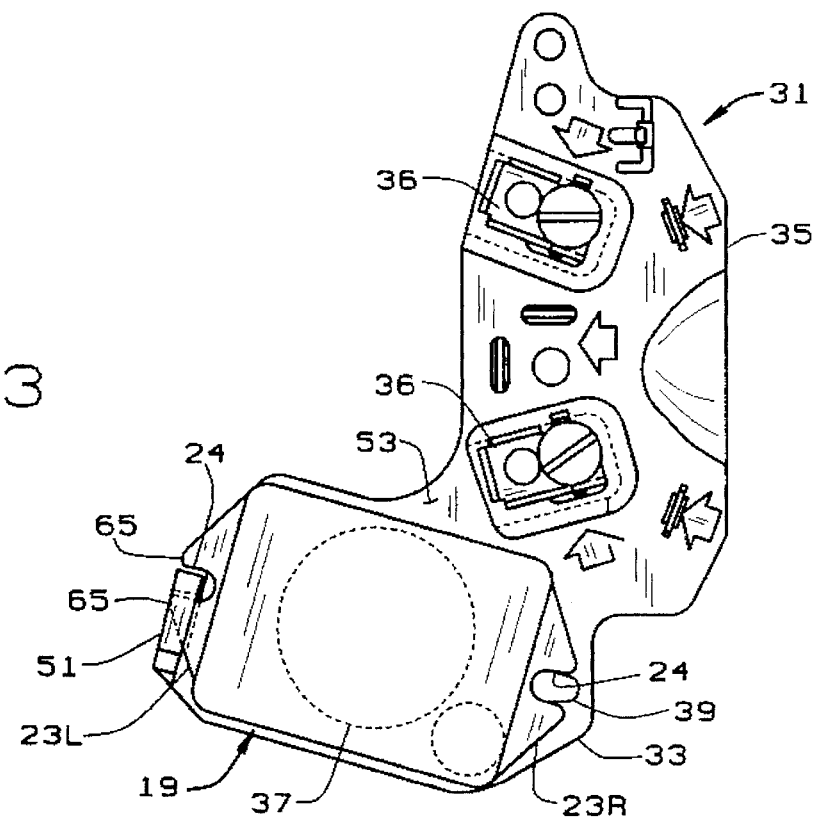
FIG. 3 is a top plan view of the terminal board with a switch secured thereto from the motor of FIG. 1.

Turning to FIGS. 3 and 4, board 31 includes a hole 37 formed generally centrally on foot 33 through which switch plug 25 extends. A second smaller hole 39 is formed radially outwardly of plug 25 near the juncture of foot 33 and leg 35. Hole 39 is preferably elongate. Hole 39 is positioned to be aligned with slot 24 in ear 23R when the switch is placed on foot 33. A screw 41 (FIG. 2) is passed through the slot 24 and hole 39 and tightened with a nut (not shown). Holes 37 and 39 preferably are positioned relative to each other so that switch 19 can be mounted in only one direction. If the switch is not mounted in the proper direction, slot 24 of ear 23R does not line up properly with hole 39 to receive screw 41. That is to say, while the ears were described above as being generally symmetrical, they are not congruent. That difference provides quick, proper orientation of the switch on the board.

A notch 47 is formed in an outer edge 49 of foot 33 on an opposite side of hole 37 from screw hole 39. An arm 51 (best shown in FIG. 6) extends across notch 47. Arm 51 is spaced vertically above an outboard surface 53 of board 31 by a neck 54. Preferably, arm 51 does not extend across the full length of the notch 47. A finger 55 extends downwardly from a free end 57 of arm 51. Finger 55 preferably has a beveled leading edge 61 and a substantially vertical trailing edge 63 which defines a bottom most point 64.

Slot 24 in switch body ear 23L creates two prongs 65 which have inner edges 67. The finger 55 trailing edge 63, with arm bottom 68, arm neck 54, and the outboard surface 53 of board 31 define a boxed slit or receptacle 69. One of the prongs 65 is received in slit 69. Finger bottom most point 64 extends below the top of ear 23R. Trailing finger edge 63, therefore, creates a block or stop which prevents prong 65 from sliding out of slit 69.

Arm 51 is slightly flexible. Prong 65 may be slid into slit 69 by urging it under finger leading edge 61 or by sliding it directly into slit 69. If the prong is slid into slit 69, arm 51 raises upwardly as prong 65 passes under finger 55. Once the prong passes the finger, the resiliency of the arm springs the arm back into place to prevent the prong from sliding out of slit 69.

To attach switch 19 to terminal board 31, the ear prong 65 is inserted into slit 69. With plug 25 in hole 37, slot 24 of ear 23R is lined up with hole 35. Screw 41 is then passed through slot 24 and hole 39 and tightened to securely fasten switch 19 to terminal board 31.

As can be appreciated, the structure of board 31 and the use of resilient arm 51 with finger 55 substantially increases the ease of securing switch 19 to board 31 by eliminating the need of one of the two screws that are commonly used to secure the switch to the board. For example, where orientation of the switch is not a concern, the switch fastener may be eliminated, the switch merely locking into a pair of the receptacles 69. Connection features for circuit C may vary. Likewise, the design silhouette of the board 31 may be altered. These variations are merely illustrative. As variations within the scope of the attached claims may be apparent to those skilled in the art, the foregoing description is set forth for illustrative purposes and is not meant to be limiting.

I claim:

1. A dynamoelectric machine including a shell, a stator positioned in said shell, a rotor mounted in said shell to a rotor shaft, at least one end shield closing an end of said shell, a rotor shaft carrying said rotor and extending radially therefrom, said rotor shaft being mounted for rotation with respect to said stator along said at least one end shield, and a terminal board mounted to said dynamoelectric machine, the improvement which comprises a switch, and means for mounting said switch to said terminal board, said switch including a switch body having a first ear and a second ear, at least one of said first and said second ears defining in an inwardly extending slot, and a fastener positionable in said slot to mount said switch body to said terminal board.

2. The improvement of claim 1 wherein said terminal board has a fastener receiving opening formed in it, said fastener being a threaded fastener positioned in said fastener receiving opening, further including a nut for holding said fastener to said board.

3. The improvement of claim 1 wherein said board includes an arm spaced therefrom, said arm having a free end defining a finger, said finger interacting with an other of said first and said second ears to mount said switch body to said terminal board.

4. The improvement of claim 3 wherein said arm is spaced above said terminal board, and adapted to define a slit between said arm and said terminal board, said slit receiving a portion of said switch body in a mounted position of said switch.

5. The improvement of claim 4 wherein said arm is a spring arm.

6. The improvement of claim 5 wherein said finger has a leading edge, said leading edge being beveled so as to permit one of said ears to slide under said leading edge.

7. The improvement of claim 6 wherein said board has a second opening formed in it, said switch includes a plug positionable at said second opening, the first and second openings in said terminal board being positioned relative to one another so that said switch is mountable to said board in only a single orientation of said switch body.

8. A terminal board for dynamoelectric machine, said terminal board being mountable to said dynamoelectric machine, said terminal board having a first opening and a second opening formed in it, said switch including a switch body including a first portion adapted to receive a fastener, said switch body first portion being alignable with one of said first and said second openings in said terminal board, for permitting insertion of a fastener therethrough, and an arm spaced from a surface of said terminal board, said arm interacting with said switch body to fix said switch body to said terminal board.

9. The improvement of claim 8 wherein in said arm is spaced above said terminal board, said arm having a free end defining a finger extending from said free end towards said terminal board.

10. The terminal board of claim 9 wherein said finger has a leading edge, said leading edge being beveled.

11. In a dynamoelectric machine, including a switch having a housing, the housing having first and second ends, the improvement comprising a terminal board mounted to said dynamoelectric machine and adapted to position said switch with respect to said dynamoelectric machine, first means for receiving the first end of said switch and second means for attaching the second end of said switch to said terminal board, said receiving means and said attaching means being adapted to mount said switch to said terminal board.

12. The dynamoelectric machine of claim 11 wherein said second means for attaching comprises a fastener.

13. The dynamoelectric machine of claim 12 wherein said fastener is threadedly received by said terminal board.

14. The terminal board of claim 13 wherein said receiving means includes an arm having a first end and a second end, said arm being attached to said terminal board at the first end, the second end being free and spaced from said terminal board.

15. The terminal board of claim 14 wherein said free second end further defines a finger extending from said arm towards said terminal board, said finger interacting with said housing to attach said switch to said terminal board in a locking relationship.

16. In a dynamoelectric machine, including a switch having a housing, the housing having first and second ends, and a terminal board mounted to said dynamoelectric machine, the improvement comprising means for positioning and mounting said switch with respect to said terminal board, said means comprising means for receiving a portion of said housing in locking relationship, and means for attaching said housing to said terminal board.

17. The improvement of claim 16 wherein said means for attaching comprises a fastener.

18. The improvement of claim 16 wherein said means for receiving comprises an arm extending outwardly from said terminal board said arm adapted to engage a portion of said switch housing.

19. The improvement of claim 18 wherein said arm has a first end and a second end, the first end being attached to said terminal board and the second end defining with said terminal board a slit sized to receive a portion of said housing.

20. The improvement of claim 19 wherein the second end of said arm defines a finger adopted to engage said housing.

21. The improvement of claim 20 wherein said arm is a spring arm.

* * * * *